(12) United States Patent
Ueno et al.

(10) Patent No.: US 11,390,320 B2
(45) Date of Patent: Jul. 19, 2022

(54) VEHICLE CONTROL SYSTEM, VEHICLE CONTROL METHOD, AND ELECTRIC POWER STEERING SYSTEM

(71) Applicant: Hitachi Automotive Systems, Ltd., Hitachinaka (JP)

(72) Inventors: Kentaro Ueno, Atsugi (JP); Hiroshi Ito, Isehara (JP); Takashi Tsutsui, Atsugi (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 641 days.

(21) Appl. No.: 16/332,585

(22) PCT Filed: Sep. 1, 2017

(86) PCT No.: PCT/JP2017/031592
§ 371 (c)(1),
(2) Date: Mar. 12, 2019

(87) PCT Pub. No.: WO2018/056023
PCT Pub. Date: Mar. 29, 2018

(65) Prior Publication Data
US 2021/0309289 A1     Oct. 7, 2021

(30) Foreign Application Priority Data

Sep. 20, 2016 (JP) .............................. JP2016-182572

(51) Int. Cl.
*B62D 6/00*       (2006.01)
*B62D 5/04*       (2006.01)
*B60W 10/20*      (2006.01)

(52) U.S. Cl.
CPC .......... *B62D 6/003* (2013.01); *B62D 5/0421* (2013.01); *B60T 2260/02* (2013.01);
(Continued)

(58) Field of Classification Search
CPC .......... B62D 6/002; B62D 6/003; B62D 6/00; B62D 6/005; B62D 6/008; B60T 2260/02; B60W 10/20
(Continued)

(56) References Cited

U.S. PATENT DOCUMENTS 5,627,754 A * 5/1997 Asanuma ............... B62D 7/159
                                                180/408
6,219,609 B1 * 4/2001 Matsuno ............... B60T 8/1755
                                                303/140
(Continued)

FOREIGN PATENT DOCUMENTS

DE   10 2007 000 995 A1   6/2009
DE   10 2008 001 179 A1   10/2009
(Continued)

OTHER PUBLICATIONS

Tota, A., Lenzo, B., Lu, Q. et al. On the Experimental Analysis of Integral Sliding Modes for Yaw Rate and Sideslip Control of an Electric Vehicle with Multiple Motors. Int.J Automot. Technol. 19, 811-823 (2018). https://doi.org/10.1007/s12239-018-0078-0 (Year: 2018).*

(Continued)

*Primary Examiner* — Cuong H Nguyen
(74) *Attorney, Agent, or Firm* — Crowell & Moring LLP

(57) ABSTRACT

An EPS controller reduces a turning angle of front wheels when it is determined that a normative yaw rate is larger than an actual yaw rate.

15 Claims, 8 Drawing Sheets

(52) U.S. Cl.
CPC ............. *B60W 10/20* (2013.01); *B62D 6/005* (2013.01); *B62D 6/008* (2013.01)

(58) Field of Classification Search
USPC .... 701/41–42; 180/443, 446, 197, 421, 6.44
See application file for complete search history.

(56) References Cited

U.S. PATENT DOCUMENTS

| | | | | |
|---|---|---|---|---|
| 6,925,371 | B2* | 8/2005 | Yasui | B62D 6/04 |
| | | | | 701/72 |
| 7,426,428 | B2* | 9/2008 | Kato | B62D 5/008 |
| | | | | 180/443 |
| 7,756,620 | B2* | 7/2010 | Bedner | B62D 6/003 |
| | | | | 701/41 |
| 8,028,789 | B2* | 10/2011 | Huang | B62D 6/002 |
| | | | | 180/443 |
| 8,100,220 | B2* | 1/2012 | Rexius | B62D 5/06 |
| | | | | 701/41 |
| 8,565,976 | B2* | 10/2013 | Kojo | B62D 5/0481 |
| | | | | 701/41 |
| 8,626,393 | B2* | 1/2014 | Strecker | B62D 5/0466 |
| | | | | 180/440 |
| 8,666,626 | B2* | 3/2014 | Futamura | B60T 8/1755 |
| | | | | 701/87 |
| 8,755,972 | B2* | 6/2014 | Aoki | B62D 17/00 |
| | | | | 701/41 |
| 8,892,309 | B2* | 11/2014 | Fujita | B62D 7/159 |
| | | | | 701/44 |
| 8,924,038 | B2* | 12/2014 | Michelis | B62D 6/008 |
| | | | | 701/1 |
| 9,156,354 | B2* | 10/2015 | Rossi | B60K 31/0008 |
| 9,233,674 | B2* | 1/2016 | Futamura | B60T 8/1755 |
| 9,561,822 | B2* | 2/2017 | Taniguchi | B62D 6/008 |
| 10,065,674 | B2* | 9/2018 | Maeda | B62D 6/00 |
| 10,077,072 | B2* | 9/2018 | Hori | B62D 5/0463 |
| 2001/0027893 | A1* | 10/2001 | Nishizaki | B60T 8/172 |
| | | | | 180/409 |
| 2005/0085986 | A1* | 4/2005 | Aizawa | B60T 8/1755 |
| | | | | 701/73 |
| 2008/0109133 | A1* | 5/2008 | Bedner | B62D 6/003 |
| | | | | 701/41 |
| 2008/0109134 | A1* | 5/2008 | Bolourchi | B62D 6/002 |
| | | | | 701/41 |
| 2008/0133066 | A1* | 6/2008 | Takenaka | B62D 6/003 |
| | | | | 701/1 |
| 2009/0138158 | A1* | 5/2009 | Greul | B62D 6/006 |
| | | | | 701/42 |
| 2014/0236443 | A1* | 8/2014 | Rodrigues | B60K 28/165 |
| | | | | 701/69 |

FOREIGN PATENT DOCUMENTS

| | | | | |
|---|---|---|---|---|
| DE | 102008001179 | B4 * | 2/2017 | ............. B62D 5/008 |
| JP | 9-104354 | A | 4/1997 | |
| JP | 11-48997 | A | 2/1999 | |
| JP | 2003-118558 | A | 4/2003 | |
| JP | 2004-256076 | A | 9/2004 | |

OTHER PUBLICATIONS

J. K. Subosits and J. C. Gerdes, "A synthetic input approach to slip angle based steering control for autonomous vehicles," 2017 American Control Conference (ACC), 2017, pp. 2297-2302, doi: 10.23919/ACC.2017.7963295. (Year: 2017).*

C. Hu, R. Wang, F. Yan, Y. Huang, H. Wang and C. Wei, "Differential Steering Based Yaw Stabilization Using ISMC for Independently Actuated Electric Vehicles," in IEEE Transactions on Intelligent Transportation Systems, vol. 19, No. 2, pp. 627-638, Feb. 2018, doi: 10.1109/TITS.2017.2750063. (Year: 2018).*

G. Garimella, J. Funke, C. Wang and M. Kobilarov, "Neural network modeling for steering control of an autonomous vehicle," 2017 IEEE/RSJ International Conference on Intelligent Robots and Systems (IROS), 2017, pp. 2609-2615, doi: 10.1109/IROS.2017.8206084. (Year: 2017).*

Manca, Raffaele, Salvatore Circosta, Irfan Khan, Stefano Feraco, Sara Luciani, Nicola Amati, Angelo Bonfitto, and Renato Galluzzi. 2021. "Performance Assessment of an Electric Power Steering System for Driverless Formula Student Vehicles" Actuators 10, No. 7: 165. https://doi.org/10.3390/act10070165 (Year: 2021).*

German-language Office Action issued in German Application No. 11 2017 004 712.9 dated Jun. 8, 2021 with English translation (10 pages).

International Search Report (PCT/ISA/210) issued in PCT Application No. PCT/JP2017/031592 dated Nov. 28, 2017 with English translation (three (3) pages).

Japanese-language Written Opinion (PCT/ISA/237) issued in PCT Application No. PCT/JP2017/031592 dated Nov. 28, 2017 (two (2) pages).

* cited by examiner

VEHICLE CONTROL SYSTEM, VEHICLE CONTROL METHOD, AND ELECTRIC POWER STEERING SYSTEM

TECHNICAL FIELD

The invention relates to vehicle control systems, vehicle control methods, and electric power steering systems.

BACKGROUND ART

A vehicle control system described in Patent Literature 1 reduces the assist torque of electric power steering when the tire force of a steered wheel is about to deviate from an estimated friction circle.

CITATION LIST

Patent Literature

PTL 1: Japanese Unexamined Patent Application Publication (Kokai) No. 11-48997

SUMMARY OF INVENTION

Technical Problem

With regard to vehicle control systems, there has been a need to generate a larger cornering force during a turning motion.

An object of the invention is to provide a vehicle control system, a vehicle control method, and an electric power steering system, which generate a larger cornering force during a turning motion.

Solution to Problem

A vehicle control system according to one embodiment of the invention reduces a turning angle if it is determined that a normative yaw rate is larger than an actual yaw rate.

The one embodiment of the invention thus generates a larger cornering force during the turning motion.

DESCRIPTION OF EMBODIMENTS

Embodiment 1

Figure 1:
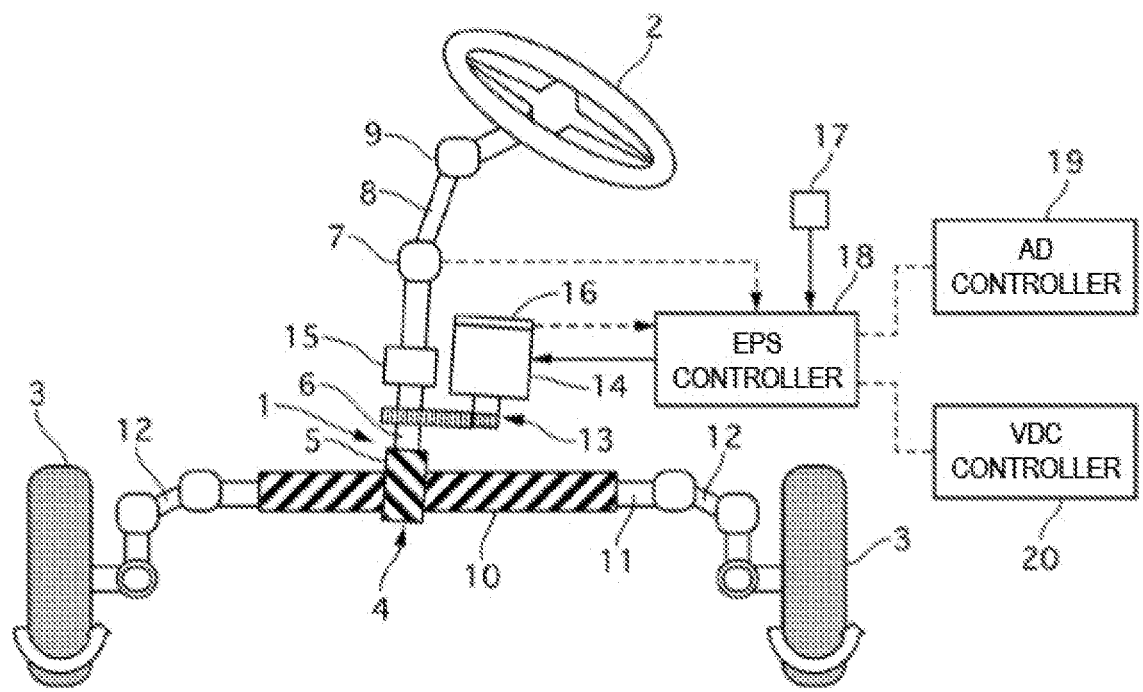
FIG. 1 is a configuration diagram of an electric power steering system according to an Embodiment 1.

FIG. 1 is a configuration diagram of an electric power steering system according to an Embodiment 1.

A steering mechanism 1 includes a rack and pinion steering gear 4 which turns front wheels (steered wheels) 3, 3 along with rotation of a steering wheel 2. The steering gear 4 includes a pinion gear 5 which is disposed at a pinion shaft 6. The pinion shaft 6 is joined to a column shaft 8 through a joint 7. The column shaft 8 is joined to the steering wheel 2. A joint 9 is disposed at a point of the column shaft 8. The steering gear 4 includes a rack gear 10 disposed at a rack shaft 11. The rack shaft 11 is joined to the front wheels 3, 3 at both ends through tie rods 12, 12. Joined to the pinion shaft 6 through a speed reducer 13 is an electric motor (hereinafter, referred to as motor) 14. Rotation torque from the motor 14 is transmitted through the speed reducer 13 to the pinion shaft 6. A torque sensor 15 is disposed at the pinion shaft 6. The torque sensor 15 detects torque which acts on the pinion shaft 6, on the basis of twist amount of a torsion bar (not shown) disposed at the pinion shaft 6. Attached to the motor 14 is a resolver 16. The resolver 16 detects a rotation angle of the motor 14. A yaw rate sensor (actual yaw rate detection section) 17 detects a yaw rate (actual yaw rate) of a vehicle. An EPS controller (control unit) 18 drive-controls the motor 14 on the basis of steering torque and driving conditions (vehicle speed and other conditions) and thus implements assist control for applying assist torque to the steering mechanism 1. The EPS controller 18 further drive-controls the motor 14 in accordance with a turning angle command from an AD controller 19 during automatic operation and thus implements automatic steering control for automatically turning the front wheels 3, 3 so that the vehicle travels along a target route. The EPS controller 18 provides information using a CAN communication system and a VDC controller 20 installed in the vehicle. The VDC controller 20 automatically carries out brake control and engine output control on the basis of driving maneuvers by a driver, vehicle speed and the like. The VDC controller 20 thus implements skid prevention control for suppressing the skidding of the vehicle on low-friction (low μ) roads and curved roads.

The EPS controller 18 of the Embodiment 1 is designed to enable a turning motion of the vehicle using the cornering force limit during the automatic steering control, and implements turning angle limitation control on the front wheels 3, 3 as described below. The turning angle limitation control is supposed to be implemented in parallel with the brake control carried out by the VDC controller 20.

Figure 2:
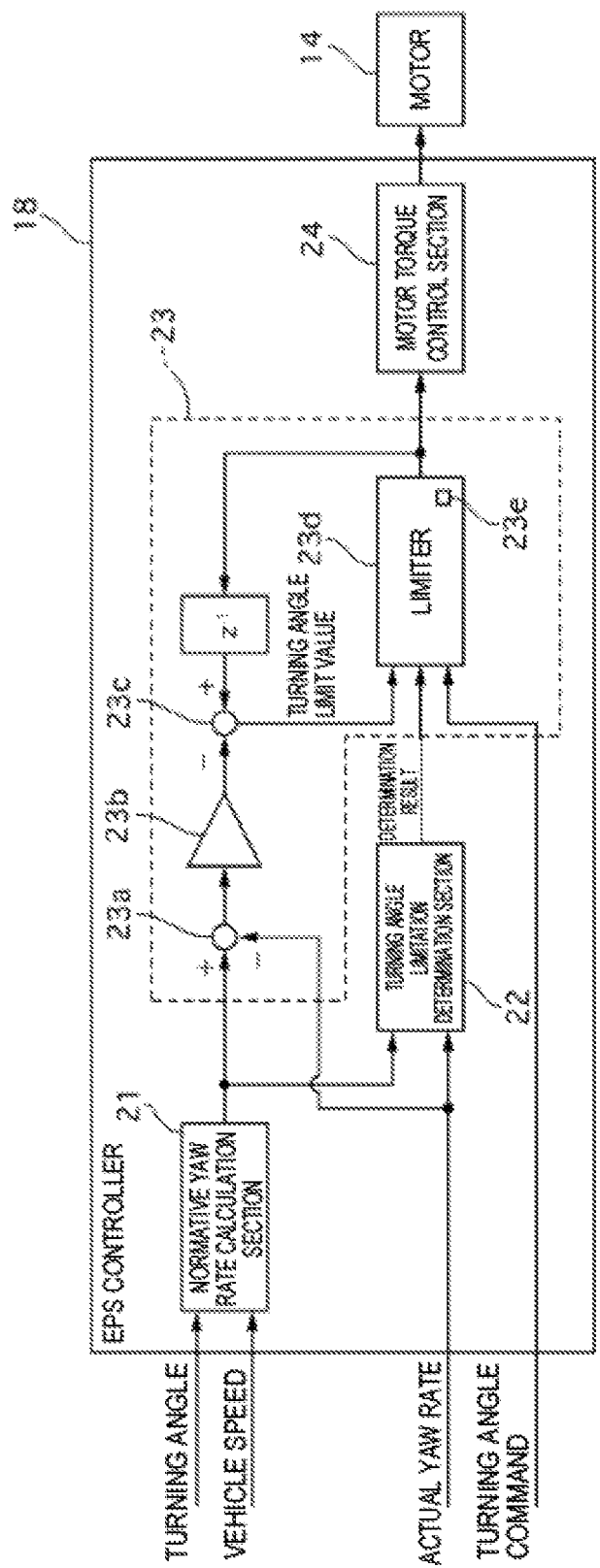
FIG. 2 is a control block diagram of turning angle limitation control according to the Embodiment 1.

FIG. 2 is a control block diagram of the turning angle limitation control according to the Embodiment 1.

The EPS controller 18 includes a normative yaw rate calculation section 21, a turning-angle limitation determination section 22, a turning angle limitation section 23, and a motor torque control section 24.

The normative yaw rate calculation section 21 calculates a normative yaw rate y that is an ideal yaw rate for a turning angle θ based on the assumption that tire characteristics of the front wheels 3, 3 are within a linear range, from the turning angle θ obtained from vehicle speed V and a motor rotation angle in view of a vehicle model shown in the following expression (1).

[Expression 1]

$$\gamma = \frac{V l_{wb} G_{ov}}{1 + A_{st} V^2} \delta \quad (1)$$

where $l_{wb}$ is a wheel base; $G_{ov}$ is an overall gear ratio; $A_{st}$ is a stability factor; and δ is a steering angle of the steering wheel 2. The steering angle δ multiplied by the overall gear ratio $G_{ov}$ makes the turning angle θ. Therefore, the expression (1) is obtained from the vehicle speed V and the turning angle θ.

The turning-angle limitation determination section 22 determines, on the basis of a yaw rate deviation obtained by deducting the actual yaw rate from the normative yaw rate, whether turning angle limitation for limiting the turning angle command for automatic steering should be implemented.

When the turning-angle limitation determination section 22 determines that the turning angle limitation should be implemented, the turning angle limitation section 23 limits the turning angle command for automatic steering. The turning angle limitation section 23 includes an adder 23a, a multiplier 23b, an adder 23c, and a limiter 23d. The adder 23a outputs the yaw rate deviation obtained by deducting the actual yaw rate from the normative yaw rate. The multiplier 23b multiplies the yaw rate deviation by a predetermined turning angle conversion factor to calculate a turning angle corresponding to the yaw rate deviation (turning angle corresponding to yaw rate deviation). The adder 23c outputs a turning angle limit value obtained by deducting the turning angle corresponding to yaw rate deviation from output (post-limitation turning angle command) of the limiter 23d in a previous control cycle. When the turning-angle limitation determination section 22 determines that the turning angle limitation should be implemented, the limiter 23d limits the turning angle command so that the yaw rate deviation equals a threshold value D (second threshold value) on the basis of the turning angle limit value. The limiter 23d includes a turning-angle limitation information transmitting section 23e. The turning-angle limitation information transmitting section 23e transmits behavior information of the turning angle limitation section 23 (yaw rate deviation, turning angle limit value, post-limitation turning angle command, etc.) to the VDC controller 20. The VDC controller 20 is capable of estimating a more accurate road friction coefficient µ from the behavior information of the turning angle limitation section 23, which improves control accuracy in the skid prevention control.

The motor torque control section 24 controls motor torque so that the turning angle of the front wheels 3, 3 matches the post-limitation turning angle command issued by the turning angle limitation section 23.

Figure 3:
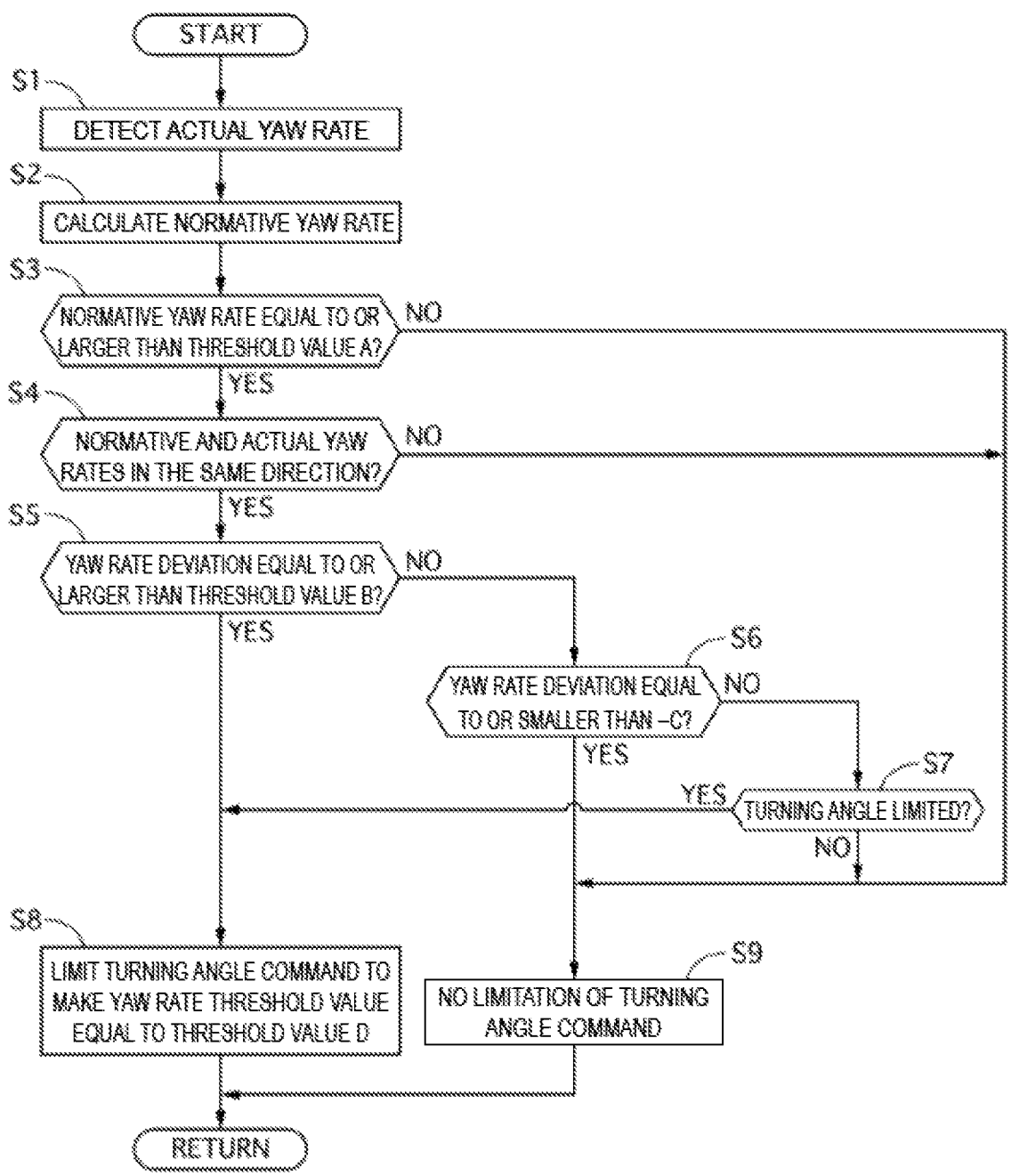
FIG. 3 is a flowchart showing a processing flow of the turning angle limitation control according to the Embodiment 1.

FIG. 3 is a flowchart showing a processing flow of the turning angle limitation control according to the Embodiment 1.

In Step S1, the turning-angle limitation determination section 22 reads the actual yaw rate detected by the yaw rate sensor 17 (actual yaw rate detection step).

In Step S2, the normative yaw rate calculation section 21 calculates the normative yaw rate from the turning angle and the vehicle speed (normative yaw rate calculation step).

In Step S3, the turning-angle limitation determination section 22 determines whether the normative yaw rate is equal to or larger than a threshold value A (third threshold value). If the determination result is YES, the flow moves to Step S3. If NO, the flow moves to Step S9. The threshold value A is a value which enables a determination that the vehicle is making the turning motion.

In Step S4, the turning-angle limitation determination section 22 determines whether the normative yaw rate and the actual yaw rate are in the same direction. If the determination result is YES, the flow moves to Step S5. If NO, the flow moves to Step S9.

In Step S5, the turning-angle limitation determination section 22 determines whether the yaw rate deviation is equal to or larger than a threshold value B (first threshold value) (turning angle limitation determination step). If the determination result is YES, the flow moves to Step S8. If NO, the flow moves to Step S6. The threshold value B is a value that is larger than the threshold value D.

In Step S6, the turning-angle limitation determination section 22 determines whether the yaw rate deviation is equal to or smaller than −C. If the determination result is YES, the flow moves to Step S9. If NO, the flow moves to Step S7.

Step S7 determines whether the turning angle limitation is active. If the determination result is YES, the flow moves to Step S8. If NO, the flow moves to Step S9.

In Step S8, the turning angle limitation section 23 outputs the post-limitation turning angle command with limitation of the turning angle command so that the yaw rate deviation equals the threshold value D (turning angle limitation step). The turning angle limitation section 23 transmits the behavior information to the VDC controller 20 (turning-angle limitation information transmitting step).

In Step S9, the turning angle limitation section 23 outputs the turning angle command without limiting the turning angle command.

Operation and advantageous effects of the Embodiment 1 will be now discussed.

At quick turning or at turning on a low-friction (low µ) road, a friction force between a road surface and a tire is liable to reach a limit. When the friction force reaches the limit, the cornering force is saturated. When the cornering force is saturated, the cornering force is prone to decrease even if the turning angle further increases. This incurs a deterioration in turning performance. In order to enhance the turning performance, the vehicle needs to make the turning motion using the cornering force limit. This can be achieved by limiting the turning angle so as not to exceed the friction force limit between the road surface and the tire. Some related technologies calculate the friction force limit from an estimated road friction coefficient µ. Regardless of driving conditions or environment, however, it is difficult to accurately estimate the road friction coefficient µ. If the turning angle is limited on the basis of the friction force limit obtained from the road friction coefficient µ, the turning angle cannot be properly limited, which results in the saturation or insufficiency of the cornering force. If this happens, it is impossible to prevent the vehicle skidding and thus to stabilize a turning behavior.

In contrast, the Embodiment 1 implements the turning angle limitation on the basis of the yaw rate deviation obtained by deducting the actual yaw rate from the normative yaw rate. When the cornering force is saturated, the vehicle does not make a vehicle motion corresponding to the turning angle. Consequently, the actual yaw rate detected by the yaw rate sensor 17 is saturated along with the saturation of the cornering force. The normative yaw rate is a yaw rate estimated from the turning angle and the vehicle speed using a model based on the assumption that the tire characteristics of the front wheels 3, 3 are within the linear range. As the normative yaw rate is the yaw rate estimated using the model with no saturation element, the normative yaw rate will not be saturated even if the cornering force is saturated. If the cornering force is not saturated, the normative yaw rate and the actual yaw rate are substantially identical with each other. If the turning angle exceeds the friction force limit, a deviation occurs between the normative yaw rate and the actual yaw rate. In other words, whether the cornering force is saturated can be determined with higher accuracy by looking at the yaw rate deviation than by estimating the road friction coefficient μ. When the yaw rate deviation occurs, the turning angle is limited. When the yaw rate deviation is solved, the vehicle can make the turning motion using the cornering force limit by cancelling the limitation on the turning angle. This prevents the saturation and insufficiency of the cornering force, preventing the vehicle skidding and stabilizing the turning behavior.

Figure 4:
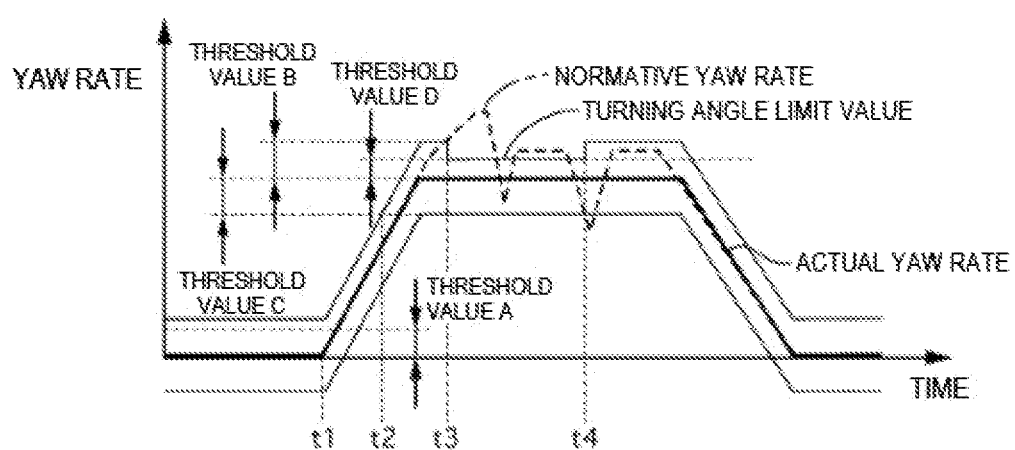
FIG. 4 is a time chart showing the action of turning angle limitation according to the Embodiment 1.

FIG. 4 is a time chart showing the action of turning angle limitation according to the Embodiment 1.

At time t1, the turning angle command for automatic steering is activated. The increase of the turning angle command increases the normative yaw rate and the actual yaw rate in an interval between the time t1 and time t2. The normative yaw rate and the actual yaw rate are identical with each other.

At the time t2, the yaw rate deviation during the turning angle limitation control, which occurs due to an increase of the normative yaw rate up to the threshold value A, starts being monitored. The turning angle limitation based on the yaw rate deviation is carried out only when the vehicle is making the turning motion, which prevents false intervention of the turning angle limitation when the vehicle travels straight. In an interval between the time t2 and time t3, the normative yaw rate and the actual yaw rate increase due to the increase of the turning angle command. The normative yaw rate and the actual yaw rate are identical with each other.

At the time t3, the yaw rate deviation increases to the threshold value B, so that the limitation of the turning angle is started. In an interval between the time t3 and time t4, the turning angle is limited on the basis of such a turning angle limit value as to make the yaw rate deviation equal to the threshold value D. The normative yaw rate becomes smaller than it is in a case without the turning angle limitation, and the yaw rate deviation remains equal to the threshold value D. This prevents the saturation of the cornering force.

At the time t4, the yaw rate deviation decreases to the threshold value −C, so that the limitation of the turning angle is cancelled. When the normative yaw rate becomes smaller than the actual yaw rate, the cancellation of the turning angle limitation prevents a decrease in the cornering force, which is caused by the turning angle limitation.

As discussed above, the turning angle limitation control of the Embodiment 1 reduces the turning angle when the yaw rate deviation is equal to or larger than the threshold value D, and increases the turning angle when the yaw rate deviation is equal to or smaller than the threshold value −C. In other words, the turning angle limitation control changes the turning angle in response to the yaw rate deviation and thus searches for a saturation point of the actual yaw rate, that is, the cornering force limit. This enables the vehicle to make the turning motion using the cornering force limit, preventing the vehicle skidding and stabilizing the turning behavior. The increase of the turning angle, which does not contribute to vehicle motions, is also prevented. This reduces a returning amount of the steering wheel when the steering wheel is returning, and improves responsivity in lateral motions.

Moreover, the turning angle limitation control according to the Embodiment 1 minimizes a deviation from a target trajectory within a given friction force limit, and also prevents a motion in a drift-out direction, which is difficult to detect, during dead reckoning of ego-vehicle's position and attitude. The turning angle limitation control according to the Embodiment 1 is therefore suitable especially for automatically-operated vehicles.

Embodiment 2

As an Embodiment 2 is similar in basic constitution to the Embodiment 1, the following description only explains differences from the Embodiment 1.

Figure 5:
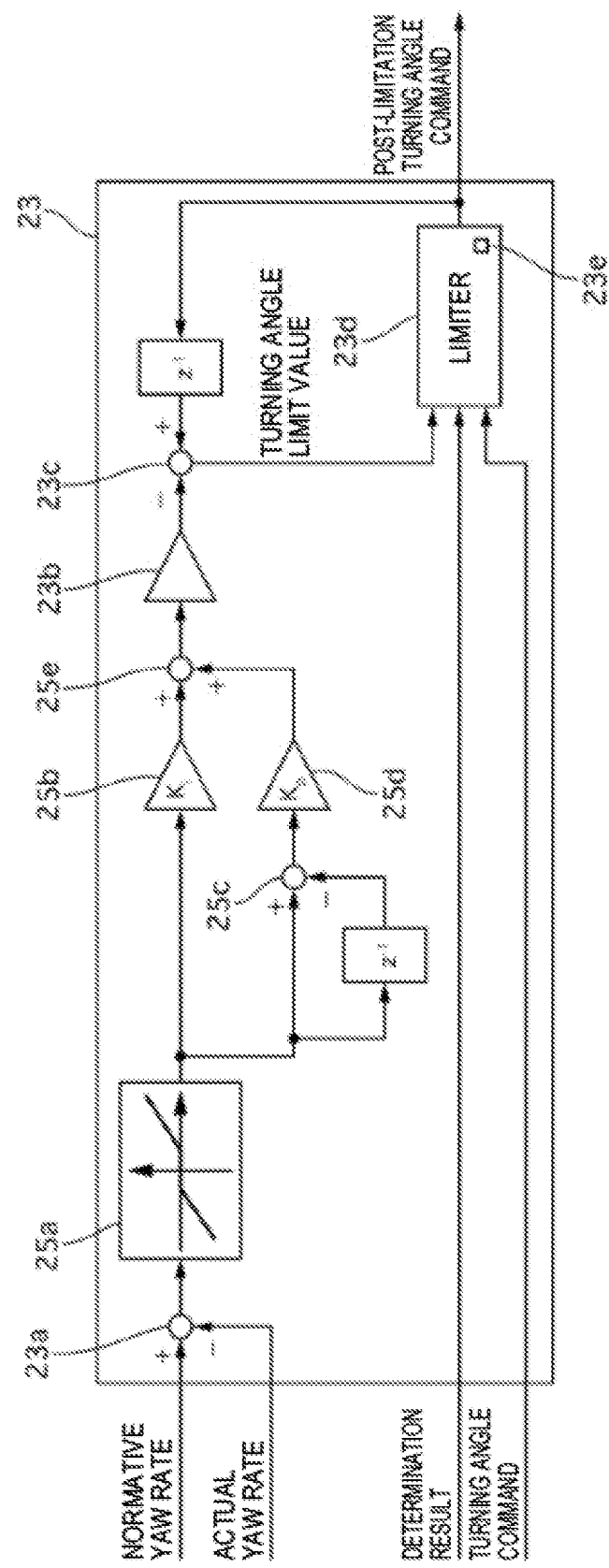
FIG. 5 is a control block diagram of a turning angle limitation section 23 according to an Embodiment 2.

FIG. 5 is a control block diagram of a turning angle limitation section 23 according to the Embodiment 2.

A dead zone block 25a outputs zero as a yaw rate deviation when the yaw rate deviation is equal to or smaller than a threshold value D, and outputs the yaw rate deviation without change when the yaw rate deviation is larger than the threshold value D. A multiplier 25b multiplies an integral gain $K_i$ by the yaw rate deviation and outputs a yaw-rate-deviation integral term. An adder 25c outputs a yaw-rate-deviation change amount that is difference between the yaw rate deviation and a yaw rate deviation in the previous control cycle. A multiplier 25d multiplies a proportional gain $K_p$ by the yaw-rate-deviation change amount and outputs a yaw-rate-deviation proportional term. An adder 25e outputs a value obtained by adding the yaw-rate-deviation integral term and the yaw-rate-deviation proportional term. The control block of FIG. 5 corresponds to a PI controller.

Operation and advantageous effects of the Embodiment 2 will be discussed below.

Figure 6:
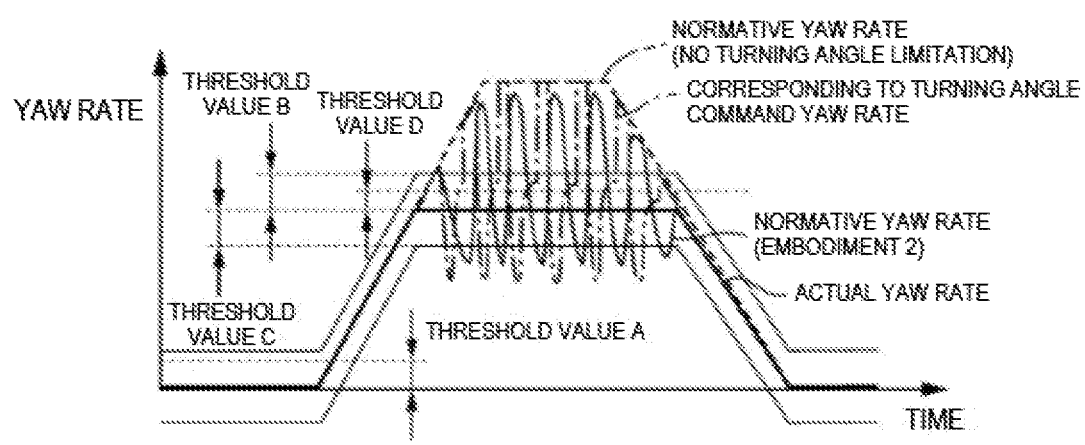
FIG. 6 is a time chart showing the action of turning angle limitation according to the Embodiment 2.

FIG. 6 is a time chart showing the action of turning angle limitation according to the Embodiment 2.

Due to a delay in turning angle response to the turning angle command, the yaw rate deviation decreases below the threshold value −C if the PI controller excessively limits the normative yaw rate, and the turning angle limitation and the cancellation of the turning angle limitation are alternated on a frequent basis. In such a situation, the turning angle command is issued in a discontinuous manner, causing a phenomenon in which the normative yaw rate fluctuates in the vicinity of an actual yaw rate as shown in FIG. 6. The turning angle limitation control of the Embodiment 2 constantly moves the turning angle to keep exploring whether the yaw rate is saturated, and thus enables the vehicle to make the turning motion using the cornering force limit. It is further possible to quickly follow an abrupt change of the road friction coefficient μ and set the turning angle limit value. Moreover, the vibration of the steering wheel 2 informs the driver of the friction force limit in the form of a steering reaction force. The fluctuation of the turning angle command has only a small impact on the vehicle behavior while the actuate yaw rate is saturated.

Embodiment 3

As an Embodiment 3 is similar in basic constitution to the Embodiment 2, the following description only explains differences from the Embodiment 2.

Figure 7:
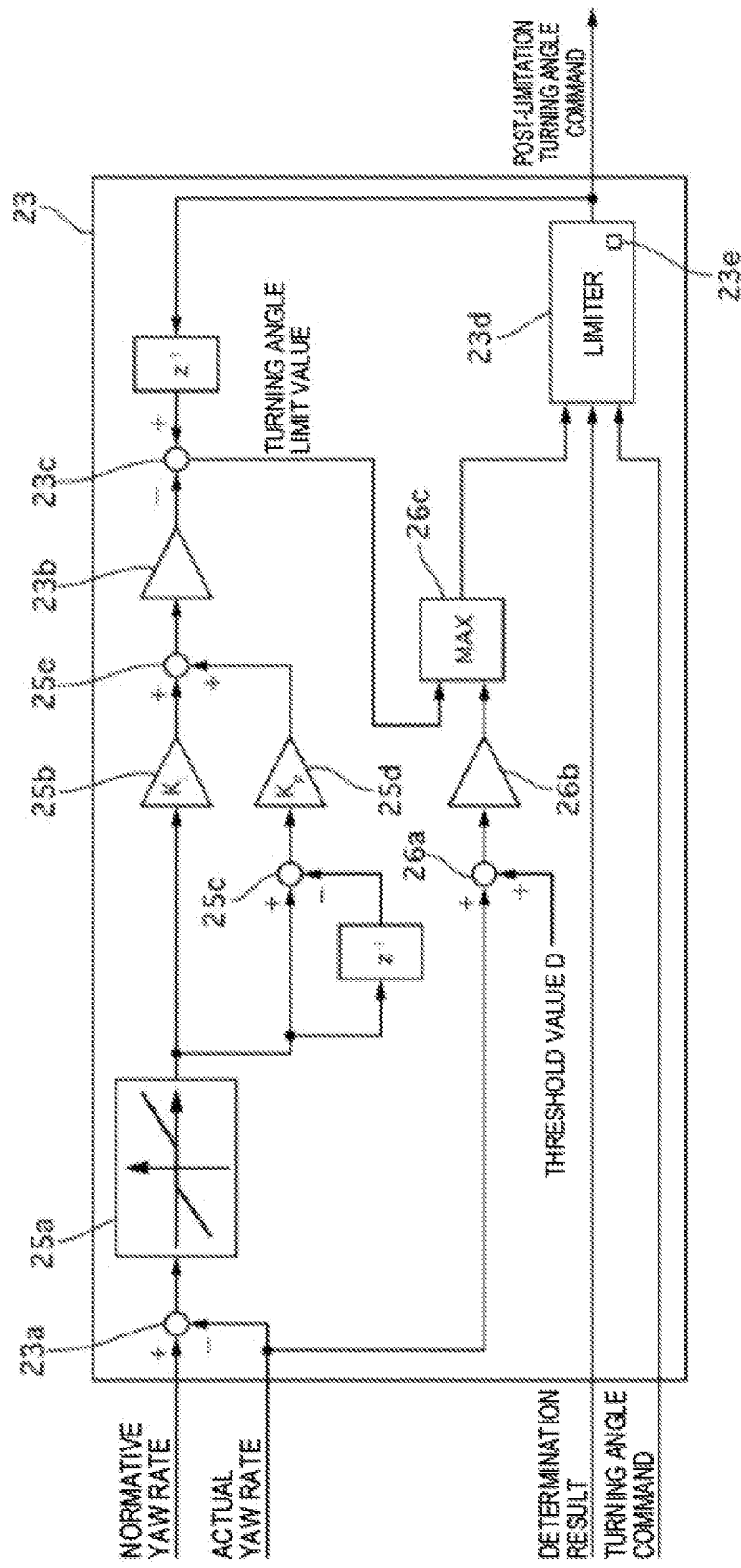
FIG. 7 is a control block diagram of a turning angle limitation section 23 according to an Embodiment 3.

FIG. 7 is a control block diagram of a turning angle limitation section 23 according to the Embodiment 3.

An adder 26a adds an actual yaw rate and a threshold value D to calculate a turning-angle-limitation lower limit value. A multiplier 26b multiplies a predetermined turning angle conversion factor by the turning-angle-limitation lower limit value to calculate a turning angle corresponding to the turning-angle-limitation lower limit value (turning angle corresponding to a turning-angle-limitation lower limit value). A turning-angle limit value selection section 26c compares the turning angle limit value to the turning-angle limitation lower limit value, and outputs whichever is larger to a limiter 23d as a final turning angle limit value.

Operation and advantageous effects of the Embodiment 3 will be now discussed below.

Figure 8:
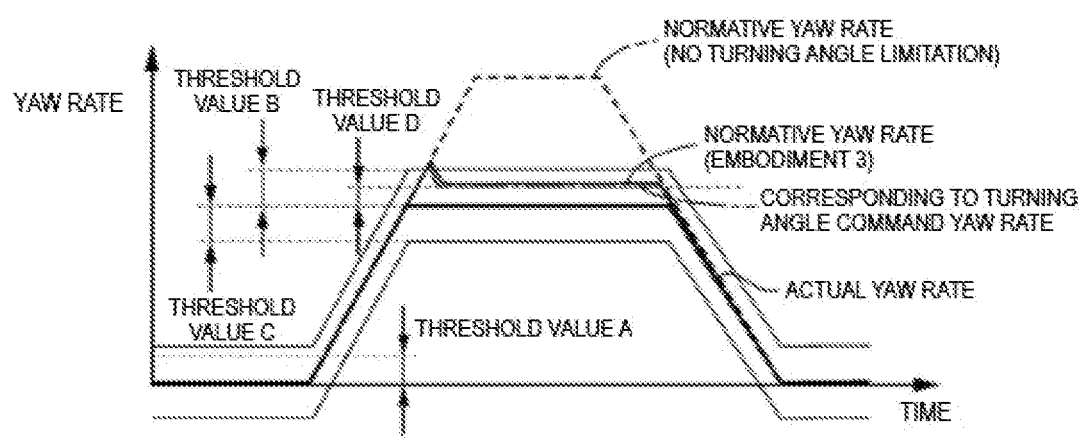
FIG. 8 is a time chart showing the action of turning angle limitation according to the Embodiment 3.

FIG. 8 is a time chart showing the action of turning angle limitation according to the Embodiment 3.

According to the Embodiment 2, if the vehicle is designed not to cancel automatic operation when the driver's hands are off the steering wheel 2, the steering wheel 2 vibrates during the turning angle limitation, which might give an uncomfortable feeling to the driver. In contrast, the Embodiment 3 limits the lower limit of the turning angle limit value to a result of addition of the actual yaw rate to the threshold value D, so that a normative yaw rate converges on the threshold value D. This makes it possible to avoid a fluctuation of a turning angle command and thus prevent the vibration of the steering wheel 2 during the off-hand automatic operation. As compared to the turning angle limitation of the Embodiment 2, the Embodiment 3 reduces the uncomfortable feeling given to the driver. Furthermore, the normative yaw rate asymptotically converges on the threshold value D, which prevents the vibration of the steering wheel 2 in a more effective manner.

Other Embodiments

The embodiments for carrying out the invention have been discussed. The specific constitution of the invention is not limited to those of the embodiments, and all design modifications and the like made without deviating from the gist of the invention are intended to be included in the invention.

The embodiments show an example in which the turning angle is limited during the automatic steering. The turning angle may be limited during the driver's manual steering. This provides the same operation and advantageous effects as those of the embodiments.

Behavior information of the turning angle limitation section may be transmitted to an engine controller. If the vehicle is an electric vehicle, the behavior information of the turning angle limitation section may be transmitted to a motor controller.

Technical ideas which can be understood from the foregoing embodiments will be discussed below.

According to an aspect, a vehicle control system comprises an actual yaw rate detection section configured to detect an actual yaw rate of a vehicle; a normative yaw rate calculation section configured to calculate a normative yaw rate from a turning angle of a steered wheel; a turning-angle limitation determination section configured to determine whether the normative yaw rate is larger than the actual yaw rate; and a turning angle limitation section configured to reduce the turning angle when it is determined that the normative yaw rate is larger than the actual yaw rate.

In a more preferable aspect according to the above aspect, the turning angle limitation section increases the turning angle when it is determined that the normative yaw rate is smaller than the actual yaw rate after the turning angle is reduced.

In another preferable aspect according to either one of the above aspects, the turning-angle limitation determination section determines whether a yaw rate deviation obtained by deducting the actual yaw rate from the normative yaw rate is equal to or larger than a first threshold value. When it is determined that the yaw rate deviation is equal to or larger than the first threshold value, the turning angle limitation section reduces the turning angle so that the yaw rate deviation is larger than zero and converges on a second threshold value that is smaller than the first threshold value.

In still another preferable aspect according to any one of the above aspects, the turning angle limitation section reduces the turning angle so that the yaw rate deviation asymptotically converges on the second threshold value.

In still another preferable aspect according to any one of the above aspects, when the normative yaw rate is equal to or larger than a third threshold value that is larger than zero, the turning-angle limitation determination section starts making a determination as to whether the normative yaw rate is larger than the actual yaw rate.

In still another preferable aspect according to any one of the above aspects, the vehicle control system comprises a turning-angle limitation information transmitting section configured to transmit behavior information of the turning angle limitation section to another control unit installed in the vehicle.

From another perspective, a vehicle control method according to an aspect comprises an actual yaw rate detection step configured to detect an actual yaw rate of a vehicle; a normative yaw rate calculation step configured to calculate a normative yaw rate from a turning angle of a steered wheel; a turning angle limitation determination step configured to determine whether the normative yaw rate is larger than the actual yaw rate; and a turning angle limitation step configured to reduce the turning angle when it is determined that the normative yaw rate is larger than the actual yaw rate.

In a more preferable aspect according to the above aspect, the turning angle limitation step increases the turning angle when it is determined that the normative yaw rate is smaller than the actual yaw rate after the turning angle is reduced.

In another preferable aspect according to either one of the above aspects, the turning angle limitation determination step determines whether a yaw rate deviation obtained by deducting the actual yaw rate from the normative yaw rate is equal to or larger than a first threshold value. When it is determined that the yaw rate deviation is equal to or larger than the first threshold value, the turning angle limitation step reduces the turning angle so that the yaw rate deviation is larger than zero and converges on a second threshold value that is smaller than the first threshold value.

In still another preferable aspect according to any one of the above aspects, the turning angle limitation step reduces the turning angle so that the yaw rate deviation asymptotically converges on the second threshold value.

In still another preferable aspect according to any one of the above aspects, when it is determined that the normative yaw rate is equal to or larger than a third threshold value that is larger than zero, the turning angle limitation determination step starts making a determination as to whether the normative yaw rate is larger than the actual yaw rate.

In still another preferable aspect according to any one of the above aspects, the vehicle control method comprises a turning-angle limitation information transmitting step configured to transmit behavior information of the turning angle limitation section to another control unit installed in the vehicle.

From another perspective, an electric power steering system according to an aspect comprises an electric motor configured to apply a steering force to a steering mechanism for turning a steered wheel, and a control unit configured to control the steering force generated in the electric motor. The control unit includes an actual yaw rate detection section configured to detect an actual yaw rate of a vehicle; a normative yaw rate calculation section configured to calculate a normative yaw rate from a turning angle of the steered wheel; a turning-angle limitation determination section configured to determine whether the normative yaw rate is larger than the actual yaw rate; and a turning angle limitation section configured to reduce the turning angle when it is determined that the normative yaw rate is larger than the actual yaw rate.

Preferably, according to the above aspect, the turning angle limitation section increases the turning angle when it is determined that the normative yaw rate is smaller than the actual yaw rate after the turning angle is reduced.

In still another preferable aspect according to either one of the above aspects, the turning-angle limitation determination section determines whether a yaw rate deviation obtained by deducting the actual yaw rate from the normative yaw rate is equal to or larger than a first threshold value. When it is determined that the yaw rate deviation is equal to or larger than the first threshold value, the turning angle limitation section reduces the turning angle so that the yaw rate deviation is larger than zero and converges on a second threshold value that is smaller than the first threshold value.

In still another preferable aspect according to any one of the above aspects, the turning angle limitation section reduces the turning angle so that the yaw rate deviation asymptotically converges on the second threshold value.

In still another preferable aspect according to any one of the above aspects, the electric power steering system comprises a turning-angle limitation start determination section configured to determine whether the normative yaw rate is equal to or larger than a third threshold value that is larger than zero. When it is determined that the normative yaw rate is equal to or larger than the third threshold value, the turning-angle limitation determination section starts making a determination as to whether the normative yaw rate is larger than the actual yaw rate.

In still another preferable aspect according to any one of the above aspects, the electric power steering system comprises a turning-angle limitation information transmitting section configured to transmit behavior information of the turning angle limitation section to another control unit installed in the vehicle.

From another perspective, a vehicle control system according to an aspect comprises an actual yaw rate detection section configured to detect an actual yaw rate of a vehicle; and a turning angle limitation section configured to change a turning angle of a steered wheel to search for a saturation point of the actual yaw rate, and limit the turning angle when the actual yaw rate is saturated.

Preferably, according to the above aspect, the turning angle limitation section reduces the turning angle when the actual yaw rate is saturated, and increases the turning angle when the actual yaw rate is not saturated.

The invention is not limited to the embodiments and may be modified in various ways. For example, the embodiments are presented to facilitate understanding of the invention and do not necessarily have to include all the constitutions discussed above. The constitution of one of the embodiments may be partially replaced with or may be incorporated into the constitution of another one of the embodiments. It is also possible to incorporate, cancel or replace the configuration of one of the embodiments into, from or with the configuration of another one of the embodiments.

The present application claims priority under Japanese Patent Application No. 2016-182572 filed on Sep. 20, 2016. The entire disclosure of Japanese Patent Application No. 2016-182572 filed on Sep. 20, 2016, including the description, claims, drawings and abstract, is incorporated herein by reference in its entirety.

REFERENCE SIGN LIST

1 Steering mechanism
3 Front wheel (steered wheel)
14 Electric motor
17 Yaw rate sensor (actual yaw rate detection section)
18 EPS controller (control unit)
20 VDC controller (another control unit)
21 Normative yaw rate calculation section
22 Turning-angle limitation determination section
23 Turning angle limitation section
23e Turning-angle limitation information transmitting section

The invention claimed is:
1. A vehicle control system comprising:
an actual yaw rate detection section configured to detect an actual yaw rate of a vehicle;
a normative yaw rate calculation section configured to calculate a normative yaw rate from a turning angle of a steered wheel;
a turning-angle limitation determination section configured to determine whether the normative yaw rate is larger than the actual yaw rate; and
a turning angle limitation section configured to reduce the turning angle when it is determined that the normative yaw rate is larger than the actual yaw rate, wherein
the turning-angle limitation determination section determines whether a yaw rate deviation obtained by deducting the actual yaw rate from the normative yaw rate is equal to or larger than a first threshold value; and
when it is determined that the yaw rate deviation is equal to or larger than the first threshold value, the turning angle limitation section reduces the turning angle so that the yaw rate deviation is larger than zero and converges on a second threshold value that is smaller than the first threshold value.
2. The vehicle control system of claim 1,
wherein the turning angle limitation section increases the turning angle when it is determined that the normative yaw rate is smaller than the actual yaw rate after the turning angle is reduced.
3. An electric power steering system comprising:
an electric motor configured to apply a steering force to a steering mechanism for turning a steered wheel; and
a control unit configured to control the steering force generated in the electric motor,
the control unit including:
an actual yaw rate detection section configured to detect an actual yaw rate of a vehicle;
a normative yaw rate calculation section configured to calculate a normative yaw rate from a turning angle of the steered wheel;
a turning angle limitation determination section configured to determine whether the normative yaw rate is larger than the actual yaw rate; and
a turning angle limitation section configured to reduce the turning angle when it is determined that the normative yaw rate is larger than the actual yaw rate, wherein
the turning-angle limitation determination section determines whether a yaw rate deviation obtained by deducting the actual yaw rate from the normative yaw rate is equal to or larger than a first threshold value; and when it is determined that the yaw rate deviation is equal to or larger than the first threshold value, the turning angle limitation section reduces the turning angle so that the yaw rate deviation is larger than zero and converges on a second threshold value that is smaller than the first threshold value.

4. The vehicle control system of claim 1,
wherein the turning angle limitation section reduces the turning angle so that the yaw rate deviation asymptotically converges on the second threshold value.

5. The vehicle control system of claim 1,
wherein when the normative yaw rate is equal to or larger than a third threshold value that is larger than zero, the turning-angle limitation determination section starts making a determination as to whether the normative yaw rate is larger than the actual yaw rate.

6. The vehicle control system of claim 1, comprising:
a turning-angle limitation information transmitting section configured to transmit behavior information of the turning angle limitation section to another control unit installed in the vehicle.

7. A vehicle control method comprising:
an actual yaw rate detection step of detecting an actual yaw rate of a vehicle;
a normative yaw rate calculation step of calculating a normative yaw rate from a turning angle of a steered wheel;
a turning angle limitation determination step of determining whether the normative yaw rate is larger than the actual yaw rate; and
a turning angle limitation step of reducing the turning angle when it is determined that the normative yaw rate is larger than the actual yaw rate, wherein
the turning angle limitation determination step determines whether a yaw rate deviation obtained by deducing the actual yaw rate form the normative yaw rate is equal to or larger than a first threshold value; and
when it is determined that the yaw rate deviation is equal to or larger than the first threshold value, the turning angle limitation step reduced the turning angle to that the yaw rate deviation is larger than zero and converges on a second threshold value that is smaller than the first threshold value.

8. The vehicle control method of claim 7,
wherein the turning angle limitation step increases the turning angle when it is determined that the normative yaw rate is smaller than the actual yaw rate after the turning angle is reduced.

9. The electric power steering system of claim 3, further comprising:
a turning-angle limitation start determination section configured to determine whether the normative yaw rate is equal to or larger than a third threshold value that is larger than zero,
wherein when it is determined that the normative yaw rate is equal to or larger than the third threshold value, the turning-angle limitation determination section starts making a determination as to whether the normative yaw rate is larger than the actual yaw rate.

10. The vehicle control method of claim 7,
wherein the turning angle limitation step reduces the turning angle so that the yaw rate deviation asymptotically converges on the second threshold value.

11. The vehicle control method of claim 7,
wherein when it is determined that the normative yaw rate is equal to or larger than a third threshold value that is larger than zero, the turning angle limitation determination step starts making a determination as to whether the normative yaw rate is larger than the actual yaw rate.

12. The vehicle control method of claim 7, further comprising:
a turning-angle limitation information transmitting step of transmitting behavior information of the turning angle limitation section to another control unit installed in the vehicle.

13. The electric power steering system of claim 3,
wherein the turning angle limitation section reduces the turning angle so that the yaw rate deviation asymptotically converges on the second threshold value.

14. The electric power steering system of claim 3,
wherein the turning angle limitation section increases the turning angle when it is determined that the normative yaw rate is smaller than the actual yaw rate after the turning angle is reduced.

15. The electric power steering system of claim 3, further comprising:
a turning-angle limitation information transmitting section configured to transmit behavior information of the turning angle limitation section to another control unit installed in the vehicle.

* * * * *